United States Patent
Morikawa

(10) Patent No.: US 11,180,260 B2
(45) Date of Patent: Nov. 23, 2021

(54) PARACHUTE

(71) Applicant: Hiroshi Morikawa, Yachimata (JP)

(72) Inventor: Hiroshi Morikawa, Yachimata (JP)

(73) Assignee: Hiroshi Morikawa, Yachimata (JP)

( * ) Notice: Subject to any disclaimer, the term of this patent is extended or adjusted under 35 U.S.C. 154(b) by 77 days.

(21) Appl. No.: 16/612,971

(22) PCT Filed: May 7, 2018

(86) PCT No.: PCT/JP2018/018440
§ 371 (c)(1),
(2) Date: Nov. 12, 2019

(87) PCT Pub. No.: WO2018/212109
PCT Pub. Date: Nov. 22, 2018

(65) Prior Publication Data
US 2020/0164991 A1   May 28, 2020

(30) Foreign Application Priority Data
May 13, 2017   (JP) .............................. JP2017-107155

(51) Int. Cl.
*B64C 17/00*   (2006.01)
*B64D 17/72*   (2006.01)

(52) U.S. Cl.
CPC .................... *B64D 17/72* (2013.01)

(58) Field of Classification Search
CPC ......... B64D 17/72; B64D 19/00; B64D 25/14
See application file for complete search history.

(56) References Cited

U.S. PATENT DOCUMENTS

| 1,903,213 A * | 3/1933 | Gleason ................. B64D 17/72 244/146 |
| 1,929,005 A | 10/1933 | Rolkerr |
| 2,993,667 A | 7/1961 | Cushman |
| 6,607,166 B1 * | 8/2003 | Pichkhadze ............... B64D 1/14 244/138 R |
| 2011/0315475 A1 * | 12/2011 | Filatov ..................... A62B 1/22 182/3 |

FOREIGN PATENT DOCUMENTS

| CN | 2873633 Y | 2/2007 |
| JP | S51004800 A | 1/1976 |
| KR | 1020070071835 A | 7/2007 |
| WO | 2014080409 A1 | 5/2014 |

* cited by examiner

*Primary Examiner* — Richard G Davis
(74) *Attorney, Agent, or Firm* — The Webb Law Firm

(57) ABSTRACT

A conventional parachute requires a velocity pressure during descent in order to open the parachute. As a result, a minimum descent distance and time are required from the beginning to the end of the parachute opening operation and use at low altitude has to be restricted. In order to remedy this issue, an airtight tube and a compressed gas device are provided together in a section of the parachute having the largest annular shape when the parachute has been opened. The tube is annularly expanded by the pressure of the gas, and the parachute is forcibly deployed and opened.

12 Claims, 2 Drawing Sheets

PARACHUTE

CROSS REFERENCE TO RELATED APPLICATIONS

This application is the United States national phase of International Application No. PCT/JP2018/018440 filed May 7, 2018, and claims priority to Japanese Patent Application No. 2017-107155 filed May 13, 2017, the disclosures of which are hereby incorporated by reference in their entirety.

TECHNICAL FIELD

The present invention is a parachute configured so that when a person jumps from an aircraft in flight, an object is lowered or dropped from the aircraft, or the aircraft itself has lost its balance to be in a falling state, the parachute is opened (hereafter, called "parachute opening") and stable descent is achieved regardless of descent velocity and altitude position.

BACKGROUND ART

Regarding parachute opening of a parachute typified by a currently used hemispherical type parachute, in midair, first, a small pilot parachute is opened, and wind pressure of descent is used to discharge and pull out the parachute from a storage bag and once render the parachute in a rod shape, whereby wind is applied to a lower section of the parachute, and a force thereof utilized to open the parachute. Moreover, when directly jumping from the aircraft, the parachute and the aircraft are provisionally joined to pull out the parachute from the storage bag and render it in a rod shape for a while, whereby wind pressure is caused to act on the lower section of the parachute to open the parachute. Furthermore, from its shape and method of use, a maximum load occurs all at once during parachute opening.

As mentioned above, parachute opening of the parachute has required a velocity pressure needed for the parachute to open, and a descent distance to generate the velocity pressure. Moreover, changing of the descent velocity or reduction of the load during parachute opening, and so on, have been impossible. Furthermore, there has been no measure for reducing an impact force occurring during landing, and the only measure when making a splash landing on water has been to rely on buoyancy of a descent object.

SUMMARY OF THE INVENTION

When parachute opening has been performed, the parachute according to the present invention has a truncated conical shape, in other words, a shape like a shuttlecock in battledore, or a shuttlecock in badminton, and a main body is made of a thin membrane (1), and seeks stable descent. The parachute does not open by a force occurring due to air resistance, and when the parachute is opened, an annular airtight tube (2) provided on a rim section representing a largest annular shape, and a compressed gas generation device (3) for inflating that tube are employed, and the parachute designed and created according to the present invention is deployed and opened when required, regardless of descent velocity and height at a time of operation.

Moreover, a small annular airtight tube (6) and a compressed gas generation device (7) are provided separately from those of the rim section in a tip section of the cone, and are provided for attenuation of impact during landing or to achieve buoyancy when a splash landing is made on water, as required.

In midair, a conventional parachute has required time from beginning to completion of a parachute opening operation, and has required velocity pressure due to descent velocity. Therefore, it has not been able to be used at low altitude. In the parachute according to the present invention, these conditions are rendered unnecessary, and the parachute is forcibly opened using a compressed gas, so a descent object can be landed safely and with little damage. Moreover, both impact in a lateral direction and impact in a longitudinal direction can be absorbed and handled by the tubes (2), (6). A shape of the annular section can be changed by changing a pressure of the tube (2), so a projective area in a vertical direction of the parachute can be changed, whereby the descent velocity can be changed. Furthermore, if the tube (2) is partitioned into small compartments in a circumferential direction and pressure of each of the compartments is changed, then descent direction can also be controlled. The parachute can be used also as a life preserver by utilizing buoyancy of the tubes, during a splash landing.

DESCRIPTION OF THE INVENTION

Figure 1:
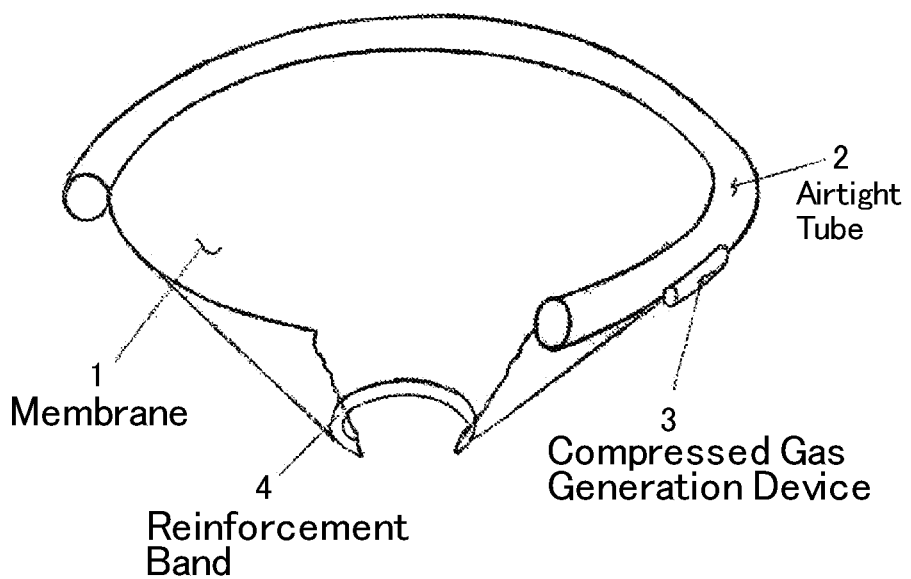
FIG. 1 is a cross-sectional perspective view of a parachute according to the present invention at a time of parachute opening.
Figure 2:
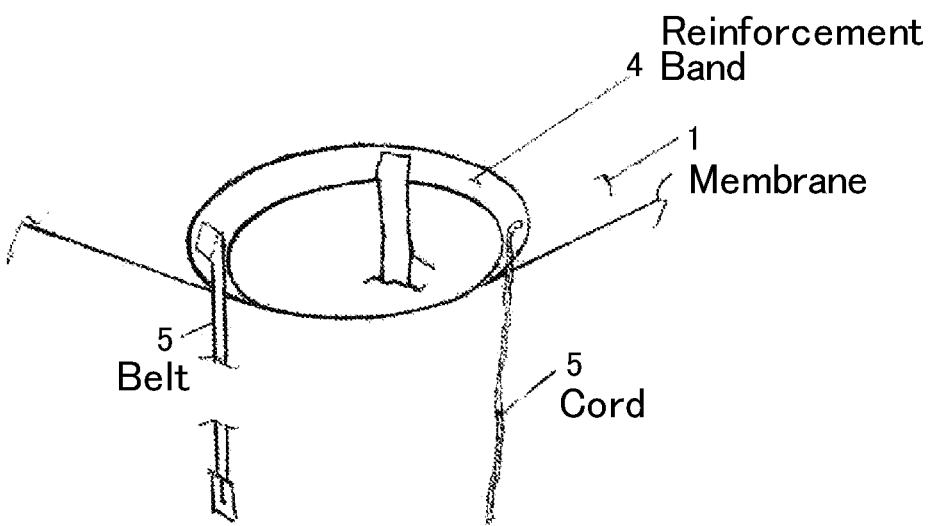
FIG. 2 is a cord, belt, hook, or the like, for coupling to a descent object attached to a parachute truncated section.

The present invention is a parachute made by a thin membrane (1) that, when opened, has a truncated conical shape like in FIG. 1, in other words, a shape like a shuttlecock in battledore or a shuttlecock in badminton. An airtight tube (2) and a compressed gas generation device (3) are provided in a largest annular section. When visibility is required, a transparent membrane may be used, or a window provided.

(a) When utilized by a person, the parachute is inserted in a folding storage box taking care to prevent it becoming tangled when opening. The belt, or the like, of FIG. 3 and a currently generally used parachute wearing belt are coupled. In order to start operation, the compressed gas generation device (3) is activated, by pulling on a cord, by generating an electric wave, or automatically, and so on. The tube (2) is inflated by a supplied gas, and the storage bag is opened, or broken whereby the parachute is discharged and opened.

(b) When adopted in a drone type aircraft typifying a small aircraft, a frame having prepared therein a fitting for coupling to the parachute which is annular in order to protect a plurality of rotor blades, is attached beforehand to a drone side. (Although it seems that drones are still not of a fixed type and that various types of drones are conceivable, it seems that there are also some drones that have an outer frame designed from the start) The parachute is folded annularly, inserted in the storage bag created annularly in the same manner, and coupled to a periphery of the descent object. (c) When the descent object is freight, a coupling apparatus is attached to the freight, and fastened by a belt, or the like. Operation in (b), (c) is the same as in (a).

An annular tube having the same function as the airtight tube (2) concentrically provided with a plurality of compressed gas generators, can be provided to this parachute between the rim section and a center.

If a gas pressure in the tube (2) is changed, a projective area of the parachute with respect to descent changes, and descent velocity can be changed. If, at a time of parachute opening, a load in a radial direction applied to the membrane becomes excessive, then it results in the tube (2) wrinkling in a circumferential direction or twisting to reduce the load. Although when a conical opening angle is large and has become an obtuse angle, undesirable movement such as sideslip and gyration conceivably occurs during use, this is dealt with at that time by providing a bottom surface of the parachute with the likes of a rib or a fin.

The compressed gas generation device (3) may also be disposed separated from the tube (2) by being additionally provided with a conduit.

Figure 3:
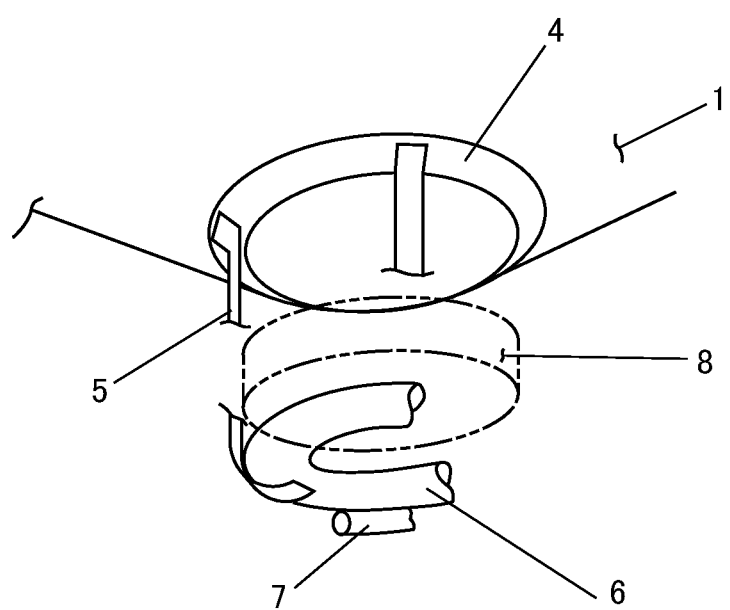
FIG. 3 is a perspective view explaining a combination of each of structures in the parachute truncated section.

FIG. 3 is a schematic view showing a relationship of a lower section of the parachute, an outer frame (8) of a flying object, and an airtight annular tube (6). When actually used, everything is rigidly bound using a belt, a cord, or the like. The annular tube (6) is for absorbing and reducing an impact occurring during landing, and is provided together with a compressed gas generation device in the same manner as p (2). There may be a plurality of stages of the annular tubes (6).

When this parachute is utilized in an aircraft, in the case of a helicopter, a configuration is adopted whereby the storage bag or a storage device is attached on an axis of a main rotor blade. In the case of an aircraft, the storage bag or storage device is provided above a main wing in the case of a high-wing type aircraft, and along a fuselage in the case of a low-wing type aircraft, and a storage device designed so as to easily discharge or be easily broken by the compressed gas, is provided.

Even in a conventionally used hemispherical parachute, utilization of the tube (2) and the compressed gas generation device (3) is effective, and is thought to reduce or prevent torch accidents. However, there is a risk of the parachute being damaged when descent velocity is fast.

The reality is that, in the case of a conventional aircraft, there is still no proactive safety device, and if the rotor blade is damaged in the case of a helicopter or if damage occurs to an engine or other main section in the case of an aircraft, then fatal damage immediately occurs. Although it is difficult for such damage to be cut to zero, the present invention is thought to significantly reduce such damage.

Moreover, the present invention is thought to contribute greatly to development of newly emerging drone type aircraft.

DESCRIPTION OF REFERENCE NUMERALS 1 membrane of parachute main body
2 airtight tube
3 compressed gas generation device for tube (2)
4 reinforcement band of parachute truncated section
5 belt, cord for coupling
6 tube (6) for attenuation of impact occurring during landing
7 compressed gas generation device for tube (6)
8 outer frame of flying object

The invention claimed is:

1. A parachute comprising:
   a membrane that has a truncated conical shape when opened,
   a first airtight tube provided in a rim section of a largest annular shape of the membrane,
   a compressed gas generation device for inflating the first airtight tube, and
   a connector provided in a section of a smallest annular shape of the membrane,
   and adapted to hold an object,
   wherein the first airtight tube is partitioned into a plurality of small compartments located around a circumference of the first airtight tube and configured such that the pressure provided in each of the compartments can be adjusted.

2. The parachute of claim 1, further comprising a second airtight tube and a compressed gas generation device for inflating the second airtight tube, wherein the second airtight tube and the compressed gas generation device are provided together in the section of a smallest annular shape of the membrane.

3. The parachute of claim 2, wherein the connector is configured to hold the object between the membrane and the second airtight tube.

4. The parachute of claim 2, wherein the second airtight tube is provided in a plurality of sections.

5. The parachute of claim 1, wherein a rib or fin for preventing sideslip of the parachute is provided on a bottom surface of the parachute.

6. The parachute of claim 1, further comprising a third airtight tube that is provided concentrically with the first airtight tube.

7. The parachute of claim 1, wherein, when the object is a drone having a plurality of rotor blades, the parachute further comprises an annular frame adapted to protect the rotor blades upon inflation of the first airtight tube.

8. The parachute of claim 1, wherein, when the object is a helicopter, the parachute further comprises a storage bag or storage device in which the parachute is stored prior to inflation of the first airtight tube and the storage bag or storage device is adapted for attachment on an axis of a main rotor blade of the helicopter.

9. The parachute of claim 1, wherein, when the object is a high-wing aircraft, the parachute further comprises a storage bag or storage device in which the parachute is stored prior to inflation of the first airtight tube and the storage bag or storage device is adapted for attachment above a main wing of the aircraft.

10. The parachute of claim 1, wherein, when the object is a low-wing aircraft, the parachute further comprises a storage bag or storage device in which the parachute is stored prior to inflation of the first airtight tube and the storage bag or storage device is adapted for attachment along a fuselage of the aircraft.

11. The parachute of claim 1, wherein adjustment of the pressure in the compartments of the first airtight tube changes a descent velocity and/or a descent direction of the parachute.

12. The parachute of claim 1, wherein the object is a person, freight, or an aircraft.

* * * * *

UNITED STATES PATENT AND TRADEMARK OFFICE
CERTIFICATE OF CORRECTION

Page 1 of 1

PATENT NO. : 11,180,260 B2
APPLICATION NO. : 16/612971
DATED : November 23, 2021
INVENTOR(S) : Hiroshi Morikawa It is certified that error appears in the above-identified patent and that said Letters Patent is hereby corrected as shown below:

In the Specification

Column 1, Line 3, Delete "CROSS REFERENCE" and insert -- CROSS-REFERENCE --

In the Claims

Column 4, Line 10, Claim 1, delete "membrane," and insert -- membrane --

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*